United States Patent
Gupta et al.

(10) Patent No.: US 8,533,473 B2
(45) Date of Patent: Sep. 10, 2013

(54) METHOD AND APPARATUS FOR REDUCING BANDWIDTH USAGE IN SECURE TRANSACTIONS

(75) Inventors: Vipul Gupta, Los Altos, CA (US); Nils Gura, Mountain View, CA (US); Arvinderpal S. Wander, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1309 days.

(21) Appl. No.: 11/072,061

(22) Filed: Mar. 4, 2005

(65) Prior Publication Data

US 2006/0209789 A1    Sep. 21, 2006

(51) Int. Cl.
*H04L 29/06*    (2006.01)
*H04L 9/32*    (2006.01)
*H04L 12/66*    (2006.01)

(52) U.S. Cl.
USPC .......... 713/171; 713/153; 380/210; 370/352; 709/247; 709/202; 709/229; 709/231; 709/235

(58) Field of Classification Search
USPC ................. 713/171, 153; 380/210; 370/352; 709/247, 229, 231, 235, 202
See application file for complete search history.

(56) References Cited

U.S. PATENT DOCUMENTS

| | | | |
|---|---|---|---|
| 4,794,639 A * | 12/1988 | Urui et al. | 379/88.19 |
| 5,956,490 A * | 9/1999 | Buchholz et al. | 709/245 |
| 6,205,173 B1 * | 3/2001 | Obradors et al. | 375/240 |
| 6,449,658 B1 * | 9/2002 | Lafe et al. | 709/247 |
| 7,289,464 B2 * | 10/2007 | Li et al. | 370/328 |
| 7,631,084 B2 * | 12/2009 | Thomas et al. | 709/227 |
| 2001/0013071 A1 * | 8/2001 | Lazaridis et al. | 709/246 |
| 2002/0129279 A1 * | 9/2002 | Spacey | 713/201 |
| 2003/0112772 A1 * | 6/2003 | Chatterjee et al. | 370/316 |
| 2003/0154308 A1 * | 8/2003 | Tang et al. | 709/247 |
| 2004/0032862 A1 * | 2/2004 | Schoeneberger et al. | 370/352 |
| 2004/0068665 A1 * | 4/2004 | Fox et al. | 713/201 |
| 2005/0182833 A1 * | 8/2005 | Duffie et al. | 709/224 |
| 2005/0216421 A1 * | 9/2005 | Barry et al. | 705/64 |

OTHER PUBLICATIONS

Badrinath, B. R. et al., "Handling Mobile Clients: A Case for Indirect Interaction," in *Proceedings of the 4th Workshop on Workstation Operating Systems*, pp. 91-97, Oct. 1993, IEEE.

Bakre, A. and Badrinath, B. R., "I-TCP: Indirect TCP for Mobile Hosts," in *Proceedings of the 15th International Conference on Distributed Computing Systems*, pp. 136-143, 1995, IEEE.

(Continued)

*Primary Examiner* — Edan Orgad
*Assistant Examiner* — Kari Schmidt
(74) *Attorney, Agent, or Firm* — Robert C. Kowert; Meyertons, Hood, Kivlin, Kowert & Goetzel, P.C.

(57) ABSTRACT

A secure end to end connection is established between a remote device having a wireless link and a control/monitoring location for the remote device through a gateway. During the establishing of the secure connection, a compressed message representation is used to communicate between the gateway and the remote device over the wireless link and an uncompressed message representation is used to communicate between the gateway and the first location. The establishment of the secure connection utilizes public-key algorithms.

41 Claims, 9 Drawing Sheets

(56) References Cited

OTHER PUBLICATIONS

Balakrishnan, H., et al., "A Comparison of Mechanisms for Improving TCP Performance over Wireless Links," in *Proceedings of ACM SIGCOMM'96*, pp. 756-769, Aug. 1996 (updated in IEEE/ACM Trans. on Networking, vol. 5, No. 6, Dec. 1997).

Barker, Elaine et al, NIST, Special Publication 800-57: Recommendation for Key Manageman—Part 1: General, 140 pages, Aug. 2005, retrieved at URL: http://www-08.nist.gov/publications/nistpubs/800-57/SP800-57-Part2.pdf.

Bormann, C., ed., "RObust Header Compression (ROHC): Framework and Four Profiles: RTP, UDP, BSP, and Uncompressed," RFC 3095, 157 pages, Jul. 2001, retrieved from URL: http://www.ietf.org/rfc/rfc3095.txt.

Bougard, B., et al., "Energy Efficiency of the IEEE 802.15.4 Standard in Dense Wireless Microsensor Networks: Modeling and Improvement Perspectives," in *Proceedings of the Design, Automation and Text in Europe Conference and Exhibition*, (DATE'05), vol. 1, pp. 196-201, Mar. 2005, IEEE.

Certicom Research, "SEC 2: Recommended Elliptic Curve Domain Parameters, Version 1.0" *Standards for Efficient Cryptography*, 50 pages, Sep. 2000, Certicom Corp., retrieved from URL: http://www.secg.org/collateral/sec2_final.pdf.

Crossbow Technology, Inc., Crossbow product information, Mote devices, developed at UC Berkeley, use 4MHz, 8-bit Atmel Atmega processor, 128KB Flash, 4KB SRAM and 4KB EEPROM, 4 pages, 2005, retrieved from URL: http://www.xbow.com/Products/products.htm.

Degermark, M., et al., "IP Header Compression," RFC 2507, 44 pages, Feb. 1999, retrieved from URL: http://www.ietf.org/rfc/rfc2407.txt.

Dierks, Tim and Allen, C., "The TLS Protocol—Version 1.0," pp. 1-80, Jan. 1999, IETF RFC 2246.

Duracell, "Alkaline Technical Bulletin," The Gillette Company, 4 pages, 2005, retrieved from URL: http://www.duracell.com/oem/Pdf/others/ATB-6.pdf.

El-Hoiydi, Amre and Decotignie, J-D., "WiseMAC: An Ultra Low Power MAC Protocol for Multi-hop Wireless Sensors Networks," in *Proceedings of the First International Workshop on Algorithmic Aspects of Wireless Sensors Networks (ALGOSENSORS 2004)*, Lecture Notes in Computer Science, LNCS 3121., pp. 18-31, Jul. 2004, Springer-Verlag.

Eschenauer, Laurent and Gligor, Virgil D., "A Key Management Scheme for Distributed Sensor Networks," in *Proceedings of the 9th ACM Conference on Computer and Communications Security*, (CCS'02), pp. 41-47, Nov. 18-22, 2002, ACM Press.

Frier, Alan O. et al., "The SSL Protocol—Version 3.0," IETF Internet Draft, 53 pages, Nov. 1996, retrieved from URL: http://wp/netscape.com/eng/ssl3/ssl-toc.html.

Gupta, Vipul, et al., "ECC Cipher Suites for TLS," IETF Internet Draft, 33 pages, May 2004, retrieved from URL: http://www.draft-ietf.tis-ecc-10.txt.

Gupta, Vipul, et al., "Integrating Elliptic Curve Cryptography into the Web's Security Infrastructure," in *The 13th International World Wide Web Conference—Alternate Track Papers and Posters*, pp. 402-403, May 17-22, 2004, New York City.

Gupta, V., "Mozilla with Elliptic Curve Cryptography," 3 pages, 2004, retrieved from URL: http://72.14.207.104/search?q=cache:pDLUsqesgMYJ:https://dev.experimentalstuff.com:8443/MozillaWithECC.html+%22mozilla+with+elliptic+curve+cryptography%22&hl=en&gl=us&ct=clnk&cd=3.

Gupta, Vipul, et al., "Sizzle: A Standards-Based End-to-End Security Architecture for the Embedded Internet," in *Proceedings of the 3rd IEEE International Conference on Pervasive Computing and Communications (PerCom)*, 10 pages, Mar. 2005, Kauai, Hawaii.

Gura, Nils, et al., "Comparing Elliptic Curve Cryptography and RSA on 8-bit CPUs," in CHES *2004 Workshop on Cryptographic Hardware and Embedded Systems*, pp. 119-132, Aug. 2004, Lecture Notes in Computer Science, Springer-Verlag, Cambridge, MA.

Harkins, D. and Carrel, D., "The Internet Key Exchange (IKE)," RFC 2409, pp. 1-39, Nov. 1998, retrieved from the Internet May 23, 2005 at URL: http://www.ietf.org/rfc/rfc2409.txt.

Hodjat, Alireza and Verbauwhede, Ingrid, "The Energy Cost of Secrets in Ad-Hoc Networks," *IEEE CAS Workshop on Wireless Communication and Networking*, 4 pages, Sep. 2002.

Jacobson, V. Compressing TCP/IP Headers for Low-Speed Serial Links, RFC 1144, 45 pages, Feb. 1990, retrieved from URL http://www.ietf.org/rfc/rfc1144.txt.

Karlof, Chris, et al, "TinySec: A Link Layer Security Architecture for Wireless Sensor Networks," *SenSys '04*, 15 pages, Nov. 3-5, 2004, ACM, Baltimore, Maryland.

Lenstra, Arjen K., and Verheul, Eric R., "Selecting Cryptographic Key Sizes,"*Journal of Cryptology: the Journal of the International Association for Cryptologic Research*, vol. 14, No. 4, pp. 255-293, 2001.

Miller, Victor S., "Use of Elliptic Curves in Cryptography," in *Proceedings of Advances in Cryptology, CRYPTO'85. Lecture Notes in Computer Science*, vol. 218, pp. 417-426,1998, Springer-Verlag.

"OpenSSL Project," *The Open Source Toolkit for SSL/TLS*, 2 pages, 1999-2002, retrieved May 23, 2005 from URL: http://www.openssl.org.

PeerSec Networks, "MatrixSSL—Open Source Embedded SSL," 3 pages, 2002-2006, retrieved May 20, 2005 from URL: http://www.matrixssl.org.

Perrig, Adrian, et al., "Security in Wireless Sensor Networks," in *Comminications of the AMC*, vol. 47, No. 6, pp. 53-57, Jun. 2004.

Perrig, Adrian et al., "SPINS: Security Protocols for Sensor Networks," *Wireless Networks*, vol. 8, pp. 521-534, 2002, Kluwer Academic Publishers, The Netherlands.

Polastre, J., "Radio Stack Iteration: How to Improve the CC1000," NEST Retreat, 21 pages, Jan. 15, 2004, retrieved from URL: http://webs.cs.berkeley.edu/retreat-1-04/slides/joep-nest-cc1000.pdf.

Polastre, J., et al., "Telos: Enabling Ultra-Low Power Wireless Research," *IPSN/SPOTS*, pp. 364-369, Apr. 2005, IEEE.

Polastre, Joe, et al., "Versatile Low Power Media Access for Wireless Sensor Networks," *SenSys '04*, 13 pages, Nov. 2004, ACM Press.

Potlapally, Nachiketh, R., et al., "Analyzing the Energy Consumption of Security Protocols," *IEEE/ACM Int'l Symposium on Low Power Electronics and Design (ISLPED'03)*, 6 pages, Aug. 25-27, 2003, Seoul, Korea.

"Summary of ANSI X9.63, Public Key Cryptography for the Financial Services Industry: Key Agreement and Key Transport using Elliptic Curve Cryptography," in *Proceedings of Key Management Using Public Key Cryptography Workshop*, NIST, 23 pages, Feb. 10-11, 2000, retrieved from URL: http://www.csrc.nist.gov/encryption/kms/summary-x9-63.pdf.

Szewczyk, Robert et al., "Habitat Monitoring with Sensor Networks," in *Communications of the ACM*, vol. 47, No. 6, pp. 34-40, Jun. 2004.

The WAP Forum, 9 pages, last change dated Nov. 6, 2002, retrieved from the Internet on May 20, 2005 at URL: http://www.openmobilealliance.org/tech/affiliates/wap/wapindex.html.

"tmote sky™," MOTEiv Accelerating Sensor Networking, Technical Documentation, 2 pages, retrieved from URL: http://www.moteiv.com/products-tmotesky.php.

"tmote sky™," IEEE 802.15.4 Module, Product Sheet, MOTEiv Wireless Sensor Networks, Moteiv Corporation. 1 page, Mar. 5, 2005, retrieved from URL: http://www.moteiv.com/products-tmotesky.php.

"tmote sky™," Product Description, MOTEiv Low Power Wireless Sensor Module, Moteiv Corporation, 28 pages, Feb. 6, 2006, retrieved from URL: http://www.moteiv.com/products-tmotesky.php.

"tmote sky™," Quick Start Guide, MOTEiv Accelerating Sensor Networking. 18 pages, Mar. 5, 2005, retrieved from URL: http://www.moteiv.com/products-tmotesky.php.

U.S. Dept. of Commerce and National Institute of Standards and Technology, "Digital Signature Standard (DSS)" *Federal Information Processing Standards Publication FIPS PUB 186-2*, pp. 1-74, Jan. 2000, retrieved from URL: http://csrc.nist.gov/publications/fips/fips186-2/fips186-2-changel.pdf.

Van Dam, Tijs and Langendoen, Koen, "An Adaptive Energy-Efficient MAC Protocol for Wireless Sensor Networks," in *Proceedings of the 1st International Conference on Embedded Networked Sensor Systems* (*SenSys*), Los Angeles, CA, pp. 171-180, Nov. 2003, ACM.

Vanstone, Scott A., "Next Generation Security for Wireless: Elliptic Curve Cryptography," *Computers and Security*, vol. 22, No. 5, pp. 412-415, Aug. 2003.

Wagner, David and Schneier, Bruce, "Analysis of the SSL 3.0 Protocol," in *The Second USENIX Workshop on Electronic Commerce*, pp. 29-40, Nov. 1996, USENIX Press, Retrieved from URL: http://www.schneier.com/paper-ssl.pdf.

Wander, Arvinderpal S., et al., "Energy Analysis of Public-Key Cryptography for Wireless Sensor Network," in *Proceedings of the 3rd IEEE International Conference on Pervasive Computing and Communications* (PerCom), pp. 324-328, Mar. 2005, Kauai, Hawaii.

Watro, Ronald, et al., "TinyPK: Securing Sensor Networks with Public Key Technology," in *Proceedings of the 2nd ACM Workshop on Security of Ad Hoc and Sensor Networks*, Washington, D.C., pp. 59-64, Oct. 2004, ACM Press.

Welsh, M., et al., "Resuscitation monitoring with a wireless sensor network," Supplement to *Circulation: Journal of the American Heart Association*, 4 pages, Oct. 2003, retrieved from URL: http://people.bu.edu/mgaynor/papers/AHA-abstract.txt and http://people.bu.edu/mgaynor/papers/AHA-poster.pdf.

Zingg, A. and Lenzlinger, B., "Mini Web Server Supporting SSL," Implementation for IPC@CHIP, Diploma Project, 75 pages, Oct. 30, 2000, retrieved from URL: http://www.strongsec.com/zhw/DA/Sna3_2000.pdf.

Koblitz, Neal, "Elliptic Curve Cryptosystems," Mathematics of Computation, vol. 48, No. 171, American Mathematical Society, Jan. 1987, pp. 203-209.

* cited by examiner

```
SSL_connect:before/connect initialization
write to 0x609880 [0x186000] (55 bytes => 55 (0x37))
0000 - 80 35 01 03 01 00 00 0c 00-00 00 20 00 00 48 00 00
0010 - 04 01 00 00 80 00 05 d4-ef be 94 db 4f 4a a0 aa
0020 - cd d2 30 1b 0b 85 41 9f-d1 a0 ac 6f 9e 9a 41 a3
0030 - c1 aa a4 fd e0 c7 01
SSL_connect:SSLv2/v3 write client hello A
read from 0x609880 [0x18c000] (7 bytes => 7 (0x7))
0000 - 16 03 00 01 19 02
0007 - <SPACES/NULS>
read from 0x609880 [0x18c007] (279 bytes => 279 (0x117))
0000 - 00 2a 03 00 e8 72 c3 f2-b3 16 60 de 8b c9 59 02
0010 - b9 10 32 62 cd bb 41 f7-73 76 f5 d3 db b7 a3 d5
0020 - a3 87 79 7f 04 c4 81 9a-03 00 00 0b 00 00 00 e3
0030 - 00 00 00 e0 00 00 dd 31-da 30 81 9a 02 01 06 30
0040 - 09 06 07 2a 86 48 ce 3d-04 01 30 11 31 0f 30 0d
0050 - 06 03 55 04 03 13 06 53-55 4e 57 2d 45 30 1e 17
0060 - 0d 30 34 30 38 30 39 31-34 32 31 33 35 5a 17 0d
0070 - 30 38 30 39 31 31 33 32-31 33 30 43 30 13 17 0d
0080 - 15 30 13 06 03 55 04 03-13 0c 31 31 32 32 33 33
0090 - 34 34 35 35 36 36 30 30-10 06 07 2a 86 48 ce 3d
00a0 - 3d 02 01 06 05 2b 81 04-00 23 a4 fc cc 88 84 4e
00b0 - 9d 01 01 4f 26 5a 62 87-f9 e3 a4 fc cc 88 84 4e
00c0 - bc 8b 46 dc be fa 7d b4-8d 0a ac 1f 01 89 8d f3
00d0 - ab 92 d4 b4 e7 f0 30 09-06 07 2a 86 48 ce 3d 04
00e0 - 01 03 30 00 30 2d 02 15-00 ad 70 97 86 11 fb da
00f0 - 60 a2 a5 af ec bc 79 8f-35 7c ad ce ed 02 14 72
0100 - 57 31 af 99 aa 69 1c 63-27 f9 90 8d 2e 23 5f bf
0110 - c8 79 92 0e
0117 - <SPACES/NULS>
SSL_connect:SSLv3 read server hello A
SSL_connect:SSLv3 read server certificate A
SSL_connect:SSLv3 read server done A
write to 0x609880 [0x2809800] (51 bytes => 51 (0x33))
0000 - 16 03 00 00 2e 10 00 00-2a 29 04 6d a0 e0 8d 9b
0010 - 60 8b c6 95 ab 1b 09 50-4a fa 82 81 d6 67 9c b2
0020 - 04 42 66 44 d2 19 bd 50-41 37 77 13 26 50 cc 66
0030 - 1e f0 98
SSL_connect:SSLv3 write client key exchange A
write to 0x609880 [0x2809800] (6 bytes => 6 (0x6))
0000 - 14 03 00 00 01 01
SSL_connect:SSLv3 write change cipher spec A
write to 0x609880 [0x2809800] (65 bytes => 65 (0x41))
0000 - 16 03 00 00 3c 7d dd 48-d3 81 9b ff 74 99 2a 82
0010 - 1f 56 30 7d 34 78 26 8e-b0 76 fd fb 4c aa f3 05
0020 - 65 50 4b bb c5 f0 54 12-8f 0c a5 11 40 7e 65 22
0030 - 37 f0 41 80 9c 2c 81 b8-1d a6 73 d8 0b ab 06 3e
0040 - 4f
SSL_connect:SSLv3 write finished A
SSL_connect:SSLv3 flush data
read from 0x609880 [0x18c000] (5 bytes => 5 (0x5))
0000 - 14 03 00 00 01
read from 0x609880 [0x18c005] (1 bytes => 1 (0x1))
0000 - 01
read from 0x609880 [0x18c000] (5 bytes => 5 (0x5))
0000 - 16 03 00 00 3c
read from 0x609880 [0x18c005] (60 bytes => 60 (0x3C))
0000 - af ca 8a e7 ca 26 f5 44-c1 25 76 96 55 64 56 da
0010 - 2c 58 a6 e1 23 62 00 a2-b6 e6 b7 95 b3 44 a1 e5
0020 - 30 97 9e 0c 7a 39 4d 0c-5f bb 76 ec db f6 bd 02
0030 - 94 ad e6 94 97 67 2e 3d-83 ec 0f df
SSL_connect:SSLv3 read finished A
---
SSL handshake has read 357 bytes and written 177 bytes
---
New, TLSv1/SSLv3, Cipher is ECDH-ECDSA-RC4-SHA
SSL-Session:
    Protocol  : SSLv3
    Cipher    : ECDH-ECDSA-RC4-SHA
    Session-ID: C4819A03
    Master-Key: 922F0EE1622F4B61B16AA309FD1ECDDF
                1D18AB038BB81473DC115256EE366E87
                CED1240602EF76F77645633C05CF8D9E
---
```

FIG. 6

```
ssl_connect:before/connect initialization
write to 0x60a200 [0x191000] (58 bytes => 58 (0x3A))
0000 - 16 03 00 00 35 01 00 00-31 03 00 41 23 c0 88 37
0010 - 88 f6 33 b8 70 d1 95-e0 93 cf 78 4e 6f 26 be
0020 - 7d fe 10 48 a7 b3 3e 21-c9 4c 6c 04 c4 81 9a 03
0030 - 00 06 00 48 00 04 00 05-01
003a - <SPACES/NULS>
ssl_connect:SSLv3 write client hello A
read from 0x60a200 [0x18c000] (5 bytes => 5 (0x5))
0000 - 16 03 00 00 2e
read from 0x60a200 [0x18c005] (46 bytes => 46 (0x2E))
0000 - 02 00 00 2a 03 00 50 0f-ad b5 90 10 e6 3d 1b 66
0010 - 4f 8b da 2d bf 33 cb 6b-e2 1c 8e b3 ec a9 d9 d5
0020 - bf 14 4c 08 e9 57 04 c4-81 9a 03 00 48
002e - <SPACES/NULS>
ssl_connect:SSLv3 read server hello A
read from 0x60a200 [0x18c000] (5 bytes => 5 (0x5))
0000 - 14 03 00 00 01
read from 0x60a200 [0x18c005] (1 bytes => 1 (0x1))
0000 - 01
read from 0x60a200 [0x18c000] (5 bytes => 5 (0x5))
0000 - 16 03 00 00 3c
read from 0x60a200 [0x18c005] (60 bytes => 60 (0x3C))
0000 - 6b 8e 56 bb 6f b5 f2 cf-08 36 4a 1e ef 99 ee e1
0010 - ac 56 ec 33 83 96 50 75-6d d6 d7 b1 60 a0 59 93
0020 - 2b 9c 19 12 42 05 2e 7e-f2 92 9e 5f 5b bd 09 bc
0030 - 59 78 4f 12 51 c0 b7 e0-fc a4 3c 15
ssl_connect:SSLv3 read finished A
write to 0x60a200 [0x280920] (6 bytes => 6 (0x6))
0000 - 14 03 00 00 01 01
ssl_connect:SSLv3 write change cipher spec A
write to 0x60a200 [0x280920] (65 bytes => 65 (0x41))
0000 - 16 03 00 00 3c 73 d0 1b-0b da 77 0c ae 43 67 d3
0010 - 6f 2c 19 a7 6b 26 28 07-9a 77 0c 72 a4 14 7b 84
0020 - 2c 79 57 81 eb 80 00 a1-a5 2d a0 ad 8b 4e b5 7c
0030 - 36 33 75 17 4f ae e1 ee-2b da 4e 76 d3 17 58 c1
0040 - 7c
ssl_connect:SSLv3 write finished A
ssl_connect:SSLv3 flush data
---
SSL handshake has read 122 bytes and written 129 bytes
---
Reused, TLSv1/SSLv3, Cipher is ECDH-ECDSA-RC4-SHA
SSL-Session:
    Protocol   : SSLv3
    Cipher     : ECDH-ECDSA-RC4-SHA
    Session-ID : C4819A03
    Master-Key : 922F0EE1622F4B61B16AA309FD1ECDDF
                 1D18AB038BB81473DC115256EE366E87
                 CED1240602EF76F77645633C05CF8D9E32
```

FIG. 7

| Uncompressed Message(s) | Compressed Representation |
|---|---|
| ClientHello (variable) | TemplateID (1), cipher suite len (2), cipher suite list (variable) Client random (32) |
| ServerHello, Certificate ServerHelloDone | TemplateID(1), server random(32), sessionId (4), Certificate Id (4) |
| ClientKeyExhange (51) | TemplateID (1), x co-ordinate (2), disambiguator for y co-ordinate (1) |
| ChangeCipherSpec (6) Finished (65) | TemplateID (1), encrypted payload of Finished message (60) |

FIG. 8

| Uncompressed Message(s) | Compressed Representation |
|---|---|
| ClientHello (variable) | TemplateID (1), cipher suite len (2), cipher suite list (variable), session ID (4), |
| ServerHello (51), | TemplateID(1), server random(32), sessionId (4), |
| ChangeCipherSpec (6) Finished (65) | TemplateID (1), encrypted payload of Finished message (60) |

FIG. 9

METHOD AND APPARATUS FOR REDUCING BANDWIDTH USAGE IN SECURE TRANSACTIONS

BACKGROUND

In the last several years, the Internet has grown rapidly beyond servers, desktops and laptops to include handheld devices like PDAs and smart phones. There is now a growing realization that this trend will continue as increasing numbers of even simpler, more constrained devices (sensors, home appliances, personal medical devices) get connected to the Internet. The term "embedded Internet" is often used to refer to the phase in the Internet's evolution when it is invisibly and tightly woven into our daily lives.

Embedded devices with sensing and communication capabilities will enable the application of computing technologies in settings where they are unusual today: device and appliance networking in the home, automated full-time monitoring of patient health, remote diagnostics and control of industrial machinery, habitat monitoring, medical monitoring and emergency response, battlefield management, intelligent irrigation. Many of these applications have strong security requirements, e.g. health information must only be made available to authorized personnel (authentication) and be protected from modification (data integrity) and disclosure (confidentiality) in transit. Even seemingly innocuous data such as temperature and pressure readings may need to be secured. Consider the case of a chemical plant where sensors are used to continuously monitor the reactions used in manufacturing the final product. Without adequate security, an attacker could feed highly abnormal readings into the monitoring system and trigger catastrophic reactions.

Secure Sockets Layer (SSL) also referred to as Transport Layer Security (TLS) is the most popular security protocol on the Internet today. SSL combines public-key cryptography for key-distribution/authentication with symmetric-key cryptography for data encryption and integrity. However, public-key cryptography is widely believed to be beyond the capabilities of embedded devices. This perception is primarily driven by experiments involving RSA, today's dominant public-key cryptosystem.

SUMMARY

In order to provide an end-to-end security architecture for secure communications for highly constrained embedded devices that are remote from their monitoring/control location, a method is provided for establishing a secure connection between a remote device (e.g., the embedded device) and the monitoring/control location for the remote device. The method includes utilizing a compressed message representation to communicate between a gateway and the remote device over a wireless link and an uncompressed message representation to communicate between the gateway and the monitoring/control location during the establishment of the secure connection. The method may include utilizing a first network communication protocol, such as TCP between the first location and the gateway and utilizing a second network communication protocol, e.g., that provides efficient reliable communication between the gateway system and the remote device over the RF link. The method may further include utilizing a public-key algorithm within the Secure Sockets Layer (SSL) protocol or Internet Key Exchange for key establishment in establishing the secure connection between the remote device and the monitoring/control location.

Another embodiment provides a system for secure end to end communication, between a remote device having capability for communicating over a wireless link and a first location that monitors and/or controls the remote device. The system includes a gateway coupled to send and receive messages to/from the remote device over a wireless interface and a second interface for communicating with the first location. The gateway is configured to utilize a compressed message representation for messages sent and received over the wireless interface and an uncompressed message representation for messages sent and received over the second interface. The compressed message representation is utilized during establishment of a secure communication link between the remote device and the first location. In an embodiment the gateway utilizes a first network communication protocol such as TCP for communicating over the second interface and a second network communication protocol for communications over the wireless link.

The gateway may further include a suppressor module responsive to receipt of a message on the second interface, the message received as part of establishment of secure communication between the first location and a remote device. The suppressor module removes fixed information and/or information that is implicitly known or derivable from the received message to create a compressed message representation of the received message. The gateway forwards the received message in compressed message representation to the remote device via the wireless interface. The suppressor module is configured to insert a message identifier to identify at least one message template corresponding to the fixed information removed from the message to create the compressed message representation. A data recreator module may be used to insert message data previously suppressed to recreate an uncompressed message for transmission from the gateway to the first location or for use by the remote device.

In another embodiment the invention provides a device that includes a wireless interface and a processing element. During establishment of a secure communication end to end communication link with a monitoring device, the device utilizes a compressed message representation for messages sent and received over the wireless interface. The device may include a suppressor module that removes fixed information from an uncompressed message that is used to establish secure communications, the suppressor module creating a compressed message representation of the uncompressed message. The suppressor module is configured to insert a message identifier to identify at least one message template corresponding to the fixed information removed from the message to create the compressed message representation. The device may further include a data recreator module to insert message data previously removed to recreate an uncompressed message for use by the device.

BRIEF DESCRIPTION OF THE DRAWINGS

FIG. 6 illustrates exemplary byte-level contents of messages in a Full Handshake.

FIG. 7 illustrates exemplary byte-level contents of messages in an Abbreviated Handshake.

FIG. 8 illustrates the compressed contents of handshake messages after passing through the suppressor module for a Full Handshake.

FIG. 9 illustrates the compressed contents of handshake messages after passing through the suppressor module for an Abbreviated Handshake.

Note that the use of the same reference symbols in different drawings indicates similar or identical items.

DESCRIPTION

In one embodiment of the invention, a small footprint implementation of Secure Sockets Layer (SSL), uses Elliptic Curve Cryptography (ECC), which allows it to be used on highly constrained, wireless, embedded devices with limited computational resources. The Berkeley/Crossbow "mote" platform and the Telos mote are examples of such devices. While the use of ECC addresses the CPU constraints of these and related devices, the size of standard SSL messages is a poor fit for their communication capabilities. In particular, the need to transmit relatively large pieces of data (e.g. X.509 certificates) in the SSL handshake has an adverse impact on both the speed of the connection setup as well as power consumption. For example, the amount of energy consumed to transmit 1 bit can be equivalent to the energy required to execute nearly 2100 CPU instructions (note that these numbers are platform specific). These mote platforms may be quite small, e.g., on the order of a size of a quarter so available power may be small.

That might prompt one to abandon SSL for these devices in lieu of other protocols. However, the use of SSL has many advantages worth preserving. The two most significant include the fact that the SSL protocol has been in use on the Internet since the mid-1990s during which time it has been critically reviewed for security flaws by many researchers and improved in response to those analyses. It is now widely trusted to secure sensitive transactions including on-line banking, stock trading, and E-commerce. In addition, SSL is already built into many popular applications—all of the well-known web browsers support it. By enabling browser based secure transactions with embedded devices, one avoids the cost and inconvenience of user retraining.

The Elliptic Curve Diffie Hellman (ECDH) key exchange and the Elliptic Curve Digital Signature Algorithm (ECDSA) are elliptic curve counterparts of the well-known Diffie-Hellman algorithm and the digital signature algorithm (DSA), respectively. In ECDH key agreement, two communicating parties A and B agree to use the same curve parameters. They generate their private keys $k_A$ and $k_B$, and corresponding public keys $Q_A=k_A G$ and $Q_B=k_B G$. The parties exchange their public keys and each party multiplies its private key and the other's public key to arrive at a common shared secret $k_A Q_B = k_B Q_A = k_A k_B G$. While a description of ECDSA is not provided here, it similarly parallels DSA. Recently, NIST approved ECC for use by the U.S. government. Several standards organizations, such as IEEE, ANSI, OMA (Open Mobile Alliance) and the IETF, have ongoing efforts to include ECC as a required or recommended security mechanism.

Figure 1:
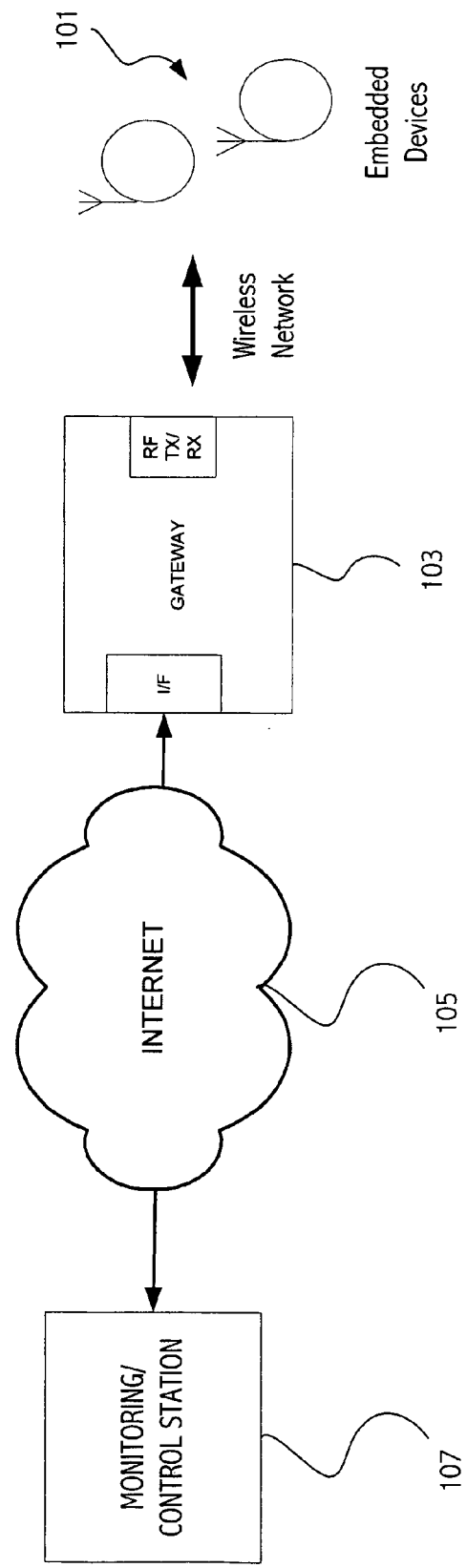
FIG. 1 illustrates an exemplary gateway based architecture for making embedded devices accessible across the Internet.

An architecture suitable for an embodiment of the present invention connects embedded device 101 to the Internet using an intermediate gateway 103 as shown in FIG. 1. A gateway joins two networks together typically utilizing a combination of hardware and software. The two networks joined together by the gateway often operate using different protocols. Such an architecture provides several benefits. More specifically, the gateway 103 serves as a bridge between the embedded devices and the rest of the Internet 105. Gateway 103 connects to the Internet using a high-speed link (e.g. ethernet) and communicates with one or more embedded devices using, e.g., a lower-speed wireless link (such as IEEE 802.15.4) optimized for power consumption. In addition, the gateway provides a single choke point for controlling access to the embedded devices. It can implement various mechanisms including, but not limited to, address based filtering to enforce selective access from across the Internet. The gateway is also the ideal place to log all interactions with the embedded devices. In an embodiment where multiple devices are connected via a single gateway, the secure web server within each device can be mapped to a distinct TCP port at the gateway.

Figure 2:
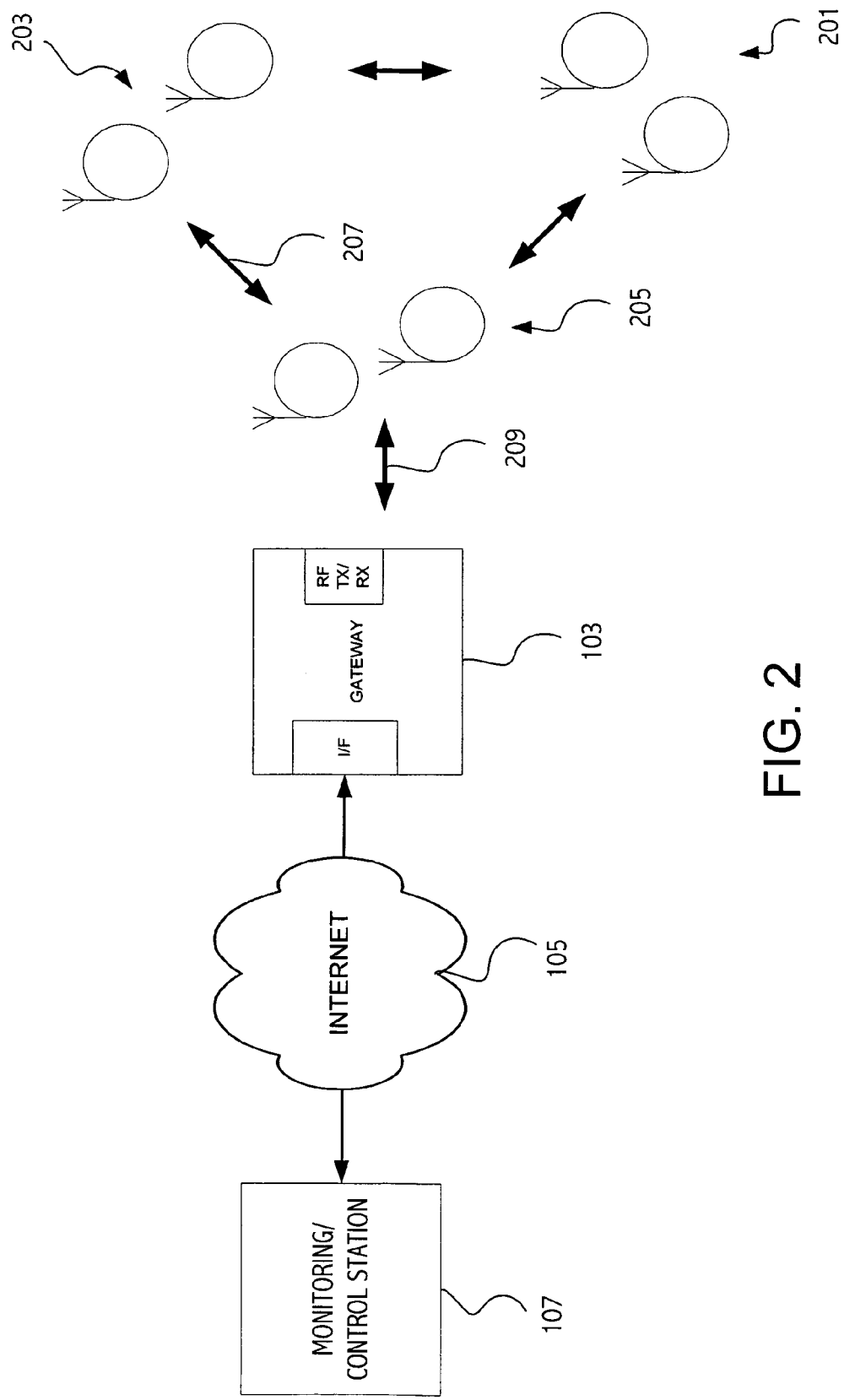
FIG. 2 illustrates another exemplary gateway based architecture in which embedded devices can communicate over a multi-hop network.

Referring to FIG. 2, another exemplary gateway based architecture suitable for one or more embodiments of the invention is shown in which embedded devices can communicate over a multi-hop network. As shown in FIG. 2, the embedded devices 201 and 203 communicate with gateway 103 through embedded devices 205. For example, embedded device 203 may communicate directly over wireless link 207 with one of the embedded devices 205, which in turn retransmits the received packets over wireless link 209 to gateway 103. While a maximum of two hops is illustrated in FIG. 2, e.g., from embedded devices 201 to 203 to 205, the number of hops is not limited to one or two hops as illustrated. For communications from gateway 103 packets destined for embedded devices 201 and 203, may be first transmitted over wireless link 209 to embedded devices 205.

One aspect of the invention described herein is a mechanism to reduce the amount of data transmitted across the wireless link(s) without compromising the end-to-end security afforded by the use of the SSL (or other) protocol. A small increase in computation is incurred in exchange for a substantial reduction in data transmission. The resulting savings in bandwidth not only speed up the handshake but also reduce power consumption.

The gateway can also serve as a performance enhancing proxy. In particular, the TCP protocol over which much of the Internet traffic (including both HTTP and HTTPS) flows was originally designed for networks with different loss characteristics than those displayed by typical wireless networks. This mismatch causes TCP to perform poorly when the connection involves a wireless hop. A well-known approach for alleviating this performance degradation splits the end-to-end path at the wireless link boundary—precisely where the gateway is situated. Terminating TCP at the gateway and using a special purpose reliable protocol between the gateway and the embedded devices has several benefits. For example, the special purpose protocol can be made simpler because it need not worry about end-to-end congestion control across multiple, possibly heterogeneous, links. Further, it can be tailored for the special loss characteristics of the single link (e.g. a NACK based scheme may be used if most of the packets sent are delivered successfully). Finally, local packet loss recovery improves overall performance.

The goal is to enable a scenario where the connection between the monitoring/control station 107 in FIGS. 1 and 2 and the embedded devices is protected end-to-end by, e.g., SSL, even though the TCP connection itself only extends between the station and the gateway. The monitoring/control stations may be a server in a hospital monitoring patients or a server in a chemical plant monitoring chemical processes, or a home computer controlling monitored household devices. The monitoring/control stations typically provide a control function in conjunction with their monitoring role. For example, the control function may be to generate alerts or adjustments of medication in a patient monitoring scenario, adjusting of household devices such as lighting or heating in response to the monitored condition, or adjusting complex chemical processes in response to monitored data.

SSL offers encryption, source authentication and integrity protection for data and is flexible enough to accommodate different cryptographic algorithms for key agreement, encryption and hashing. Particular combinations of these algorithms are called cipher suites, e.g. the cipher suite TLS_RSA_WITH_RC4_128_SHA uses RSA for key exchange, 128-bit RC4 for bulk encryption, and SHA for hashing.

Figure 3:
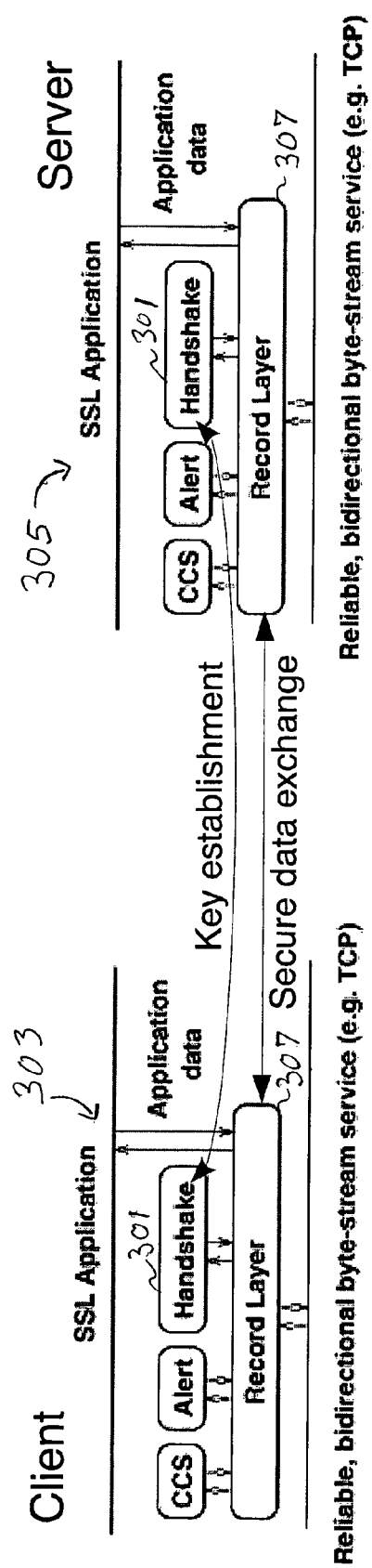
FIG. 3 illustrates the different software layers in an implementation of the SSL security protocol.

The two main components of SSL are the Handshake protocol and the Record Layer protocol. FIG. 3 illustrates software layers in an implementation of the SSL security protocol. The Handshake protocol 301 allows an SSL client 303 and server 305 to negotiate a common cipher suite, authenticate each other, and establish a shared master secret using public-key algorithms. The Record Layer 307 derives symmetric keys from the master secret and uses them with faster symmetric-key algorithms for bulk encryption and authentication of application data, thus providing secure data exchange.

Since public-key operations are computationally expensive, the protocol's designers added the ability for a client and server to reuse a previously established master secret. This feature is also known as "session resumption", "session reuse" or "session caching". The resulting abbreviated handshake does not involve any public-key cryptography, requires fewer, shorter messages and can be completed more quickly than a full handshake.

The gateway can play an important role in reducing the amount of data that must be transmitted across the wireless hop in setting up an SSL connection. One key observation is that due to severe resource constraints, an embedded device will preferably implement a small set of cipher suites using a small number of parameters (such as the elliptic curve). In this situation, much of the data exchanged during an SSL handshake stays fixed from one connection attempt to another and does not need to be transmitted across the wireless link every time. For example, the X.509 certificate sent by the SSL server in the embedded device is the single biggest piece of data exchanged in a handshake and does not change across distinct connection attempts using the same cipher suite.

In an embodiment, data suppressor/recreator modules are inserted between the SSL protocol handler and the wireless transceiver at both ends of the wireless hop. At the sender, the suppressor module strips off information that is implicitly known to the receiver or easily derivable. At the receiver, the recreator module is responsible for reinserting the suppressed information. As far as the layers above these modules are concerned, the protocol is still SSL and thus retains its desirable properties including end-to-end security. Under the reasonable assumption that an embedded device and its corresponding gateway are administered and deployed by the same organization, this architectural modification can be made easily in a manner that is completely transparent to the remote clients. That is, remote clients can use standard SSL without having to be aware of the suppressor/recreator modules. Note that these modules work together to reduce the bandwidth consumed by the handshake messages, which are sent in the clear. The suppressor/recreator modules pass through secured application data unmodified. Since that data is encrypted and the gateway is not privy to the keys used to secure the data, the gateway cannot operate on that data.

Figure 4A:
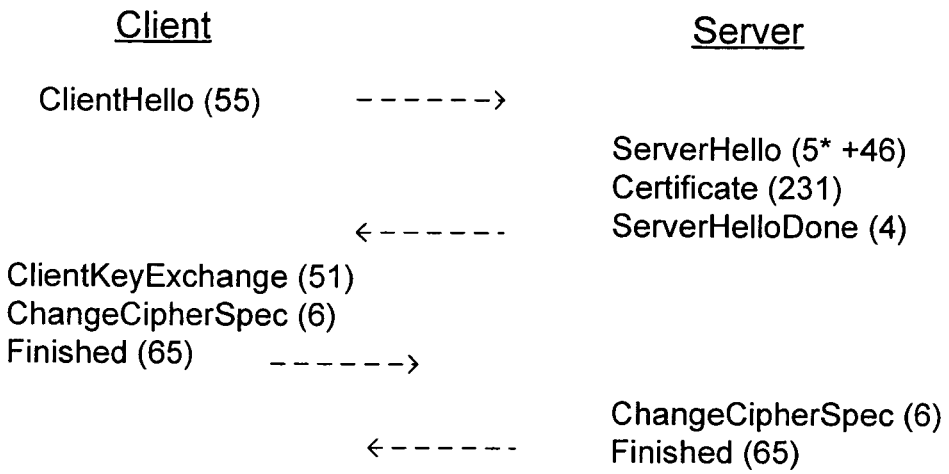
FIG. 4A illustrates exemplary SSL Messages (with size in bytes) sent in a Full Handshake.

The general operation of an ECDH-ECDSA handshake, is shown in FIG. 4A. The client and server first exchange random values (used for replay protection) and negotiate a cipher suite using the ClientHello and ServerHello messages. The ServerCertificate message contains the server's ECDH public key signed by a certificate authority using ECDSA. After validating the ECDSA signature, the client conveys its ECDH public key to the server in the ClientKeyExchange message. Next, each entity uses its own ECDH private key and the other's public key to perform an ECDH operation and arrive at a shared premaster secret. Both end points then use the premaster secret to create a master secret which, along with previously exchanged random values, is used to derive the cipher keys, initialization vectors and MAC (Message Authentication Code) keys for bulk encryption and authentication by the Record Layer.

The use of ECDH and ECDSA in SSL mimics the use of DH and DSA, respectively. The SSL specification already defines cipher suites based on DH and DSA so the incorporation of ECC is not a large change.

Figure 4B:
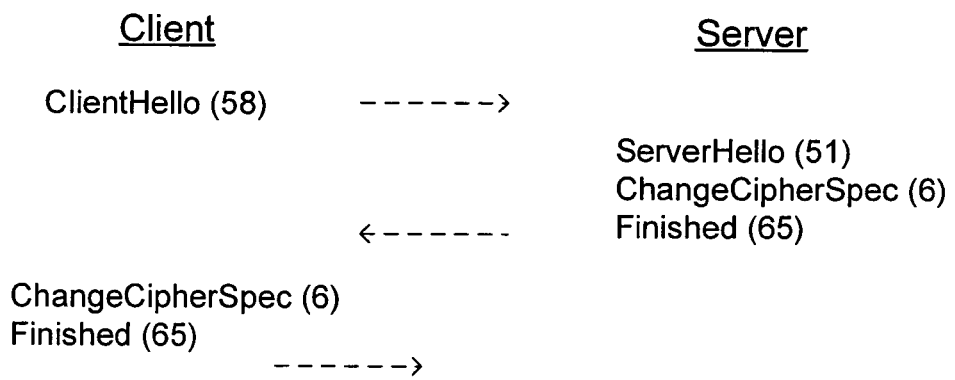
FIG. 4B illustrates exemplary SSL Messages (with size in bytes) sent in an Abbreviated Handshake, i.e. a session reuse.

The abbreviated handshake protocol is shown in FIG. 4B. Here, the ClientHello message includes the non-zero ID of a previously negotiated session. If the server still has that session information cached and is willing to reuse the corresponding master secret, it echoes the session ID in the ServerHello message. Otherwise, it returns a new session ID thereby signaling the client to engage in a full handshake. The derivation of symmetric keys from the master secret is identical to the full handshake scenario.

A number of bandwidth and memory saving options may be utilized in an embodiment especially appropriate for embedded devices. One such embodiment preferably utilizes Elliptic Curve Cryptography (ECC) rather than RSA for key exchange. ECC can provide the same level of security as RSA using much smaller keys. It brings the powerful advantages of public-key cryptography to embedded devices like the mote where traditional mechanisms like RSA are less practical. In an effort to conserve program and data memory, only a single version (3.0) of the SSL protocol, a single cipher suite (ECDH-ECDSA-RC4-SHA) and a single elliptic curve (secp160r1) is enabled in one embodiment. Other embodiments of the invention may use different cipher suites employing different public-key key exchange mechanisms. These key exchange mechanisms may be based on RSA, the Diffie-Hellman key exchange, the Digital Signature Algorithm, or other public-key algorithms that are currently not part of the SSL specifications. In addition, embodiments may support more than one cipher suite.

Thus, while ECC may preferably be used for key exchange instead of RSA in some embodiments, in other embodiments, e.g., where the remote devices have more robust processing capability, RSA may be utilized for key exchange. In such an RSA embodiment, the handshakes shown in FIGS. 4A and 4B would have more bytes transmitted, but the advantage of handshake compression would still be beneficial, particularly in terms of reduced power consumption in the remote device that takes advantage of compression.

In an embodiment, the cipher suite enabled requires an ECC certificate. ECC keys are already smaller than RSA keys but additional effort is made to keep the certificate small. In particular, the subject and issuer names can be deliberately chosen to be brief (but no so short that they would compromise authentication) and optional certificate extensions have been omitted.

A 4-byte session identifier value may be used rather than the longer 32-byte values used in other servers with much larger scalability requirements. In particular, tight memory constraints in the embedded devices may preclude the possibility of storing information for more than a handful of connections in the session cache and a four byte identifier is more than sufficient to identify each cached session uniquely. In other embodiments, the session identifier may be larger or smaller than four bytes. The tradeoff in the session identifier is between the identifier size and the possibility of identifier collisions.

The ServerHello, Certificate and ServerHelloDone messages may be packed in a single SSL record rather than sending them as three separate records each with its own 5-byte header. In an embodiment, the cipher suite implemented does not entail sending the ServerKeyExchange message. Also, the CertificateRequest message is not sent out, which automatically eliminates the client's Certificate and CertificateVerify messages. This also obviates the need to have any certificate (specifically, ASN.1) parsing code. Note that this does not preclude authentication of the client using passwords (one-time or otherwise) over SSL as is commonly done for on-line banking, stock trading and e-commerce.

Figure 5:
FIG. 5 illustrates exemplary SSL Messages sent in a Full Handshake including optional messages.

In another embodiment, rather than just the server sending a certificate, the client can authenticate using a certificate as well. Mutual authentication requires additional messages be sent between the server and the client. Referring to FIG. 5, the message flow for a full handshake is shown in which the asterisks indicate optional or situation-dependent messages that are not always sent. For instance, the Client's Certificate and CertificateVerify messages are only sent in response to the Server's CertificateRequest message. These three messages allow a client to be authenticated within the SSL protocol (as opposed to client authentication at the application layer which typically takes the form of a password sent over an SSL secured channel). The bandwidth reduction techniques described herein are also applicable to SSL handshakes involving the transmission of these optional/situational-dependent messages.

With the bandwidth saving options just described, the total number of bytes exchanged in a full SSL handshake is under 600 bytes. In contrast, for an RSA-based handshake, the server's certificate alone is typically more than 600 bytes. In an exemplary embodiment involving an SSL connection with an ECC cipher suite between the OpenSSL and a remote RF device, sizes of exemplary message are shown in parenthesis in FIGS. 4A and 4B. The asterisk within parentheses next to the ServerHello message in FIG. 4A indicates that a common 5-byte header is used to pack all three messages. FIG. 4A illustrates a Full Handshake message with total bytes of 534 (client: 177, server: 357). FIG. 4B illustrates an Abbreviated Handshake with total bytes of 251 (client: 129, server: 122).

FIGS. 6 and 7 show byte-level contents of the messages exchanged in an exemplary embodiment. A careful examination reveals that for a given server almost all SSL messages retain their size from one connection attempt to another. The only exception is the ClientHello message sent in a Full Handshake which may vary in size because different clients may propose different sets of cipher suites. Even then, the ClientKeyExchange message will have the same size since it is governed by the curve used for the server's public key. This observation suggests that there is no need to send the length information explicitly for most messages.

Furthermore, in most cases, not just the length of the message but significant parts of its content stay fixed. In FIG. 6 only the parts of messages identified as 601 contain data that changes for each connection request. Similarly for message shown in FIG. 7, only those parts of the message identified as 701 contain data that changes for each connection request. The data suppressor and recreator modules only need to exchange this information across the wireless hop. A few additional bytes are needed to identify the rest of the message "template" (the unchanging part in each message clump). In one embodiment, there are six such templates and they can be identified using a 1-byte identifier.

1. ClntHellov2 template corresponding to the ClientHello message (formatted as per SSLv2.0) in a full handshake;
2. SvrHelloCert template corresponding to the ServerHello, Certificate and ServerHelloDone messages in a full handshake;
3. ClntKeyExch template corresponding to the ClientKeyExchange message in a full handshake;
4. ClntHellov3 template corresponding to the ClientHello message (formatted as per SSLv3.0) in the abbreviated handshake;
5. SvrHello template corresponding to the ServerHello message in the abbreviated handshake;
6. CCSFinished template corresponding to the ChangeCipherSpec and Finished messages sent in both the full and abbreviated handshakes.

The use of the templates allows a significant reduction in traffic. Each suppressor module, based on the message type, replaces those portions of a message that remain unchanged with a much smaller template identifier. On receipt of the compressed message, the recreator module accesses the appropriate stored template based on the template identifier and recreates the full message using the template identifier.

The Certificate message is an extreme example where the entire content is fixed. At each embedded device, the suppressor module can replace its certificate with a much smaller unique certificate identifier. A unique certificate identifier may be created using a cryptographic hash of the certificate (or using part of the hash). Exemplary cryptographic hash algorithms are MD5 and SHA. By storing a table of certificates at the gateway, the gateway recreator module can use this identifier to look up the corresponding certificate.

In FIG. 6, the ClientKeyExchange message includes both the x and y coordinate of the elliptic curve point representing the public key. In reality, the y coordinate can be computed from x using the elliptic curve equation. For a given x-coordinate, there can be two possible values for y so an additional bit is needed to uniquely identify the y-coordinate. While the SSL protocol includes a provision to carry compressed points in the ClientKeyExchange message, such support is not mandatory in compliant implementations. But even when the remote client does not support point compression, compressed points can be used across the wireless hop in a transparent manner.

FIGS. 8 and 9 illustrate how different SSL handshake messages can be "compressed" by the suppressor module as they traverse the wireless hop. For the earlier message example shown in FIG. 4, the use of the suppressor/recreator modules reduces the number of bytes sent across the wireless hop in a Full Handshake from 534 to 232. Of these, the suppressor layer at the gateway sends 130 bytes (1 byte for ClntHellov2 template Id, 2 bytes for cipher suite length, 12 bytes for the cipher suite list, 32 bytes of a client random value, 1 byte for the ClntKeyExch template Id, 20 bytes for the x-coordinate, 1 byte to disambiguate the y-coordinate, 1 byte for the CCSFinished template Id and 60 bytes for the encrypted payload from the Finished message) and the suppressor layer at the server sends 102 bytes (1 byte for the SvrHelloCert template Id, 32 bytes of a server random value, 4 bytes of session identifier, 4 bytes of certificate identifier, 1 byte for the CCSFinished template Id and 60 bytes for the encrypted payload from the Finished message). The compression illustrated is exemplary and other compression approaches may vary. For example, another embodiment may not utilize point compression and thus the y coordinate is sent instead of the one byte to disambiguate the y-coordinate. Note that the original size of the encrypted Finished message is 65 bytes because it has a 5-byte SSL record layer header, a 4-byte handshake layer header, 36-byte payload, a 20-byte MAC (since the hashing algorithm in the negotiated cipher suite is SHA1). Everything beyond the record layer header is encrypted with RC4 which is a stream cipher and does not add any padding. Due to encryption, these 60 bytes cannot be compressed further without violating the end-to-end security guarantee because the gateway does not have the keys needed for decryption.

FIG. 9 illustrates operation of the suppressor module for an Abbreviated handshake. As shown in FIG. 9 the number of bytes sent across the wireless hop in the Abbreviated handshake is reduced from 251 (see FIG. 5) to 204. Of these, the suppressor layer at the gateway sends 106 bytes (1 byte for the ClntHellov3 template Id, 32 bytes of client random, 4 bytes of session Id, 2 bytes for cipher suite length, 6 bytes for cipher suite list, 1 byte for the CCSFinished template Id and 60 bytes of encrypted Finished message) and the suppressor layer at the server sends the remaining 98 bytes (1 byte for the SvrHello template Id, 32 bytes for server random, 4 bytes for session Id, 1 byte for the CCSFinsihed template Id and 60 bytes of the encrypted Finished message).

The methodology described herein requires a certain amount of information (e.g. certificates) to be exchanged a priori between the gateway and the embedded device. That can be done manually at the time of deploying the embedded device network or through an automated discovery process whereby the gateway solicits any embedded devices in its vicinity to register. During this discovery phase, the embedded devices can also signal to the gateway whether or not they support the bandwidth savings mechanisms described herein. In this fashion, a common gateway can be used to service both kinds of embedded devices. When interacting with devices that do not support this mechanism, the advantages of reduced data transmission in setting up a secure connection are not realized.

Various techniques can be utilized for populating the templates. In one embodiment the remote device initially utilizes a full handshake without compression to establish secure communications. The gateway can monitor that traffic and derive from the handshake messages the appropriate data to populate the templates. The template identifiers may be predefined. Once the templates are established, the gateway can indicate to the remote device that it can now utilize compressed communications to establish a secure connection. In another embodiment the remote device sends the template information to gateway. The template information may be sent as part of the registration process. Alternatively, manual configuration may be used for the templates.

The use of the suppressor/recreator modules has the potential to reduce the amount of data transmitted by over 50% for a full SSL handshake and almost 20% for an abbreviated handshake.

Figure 10:
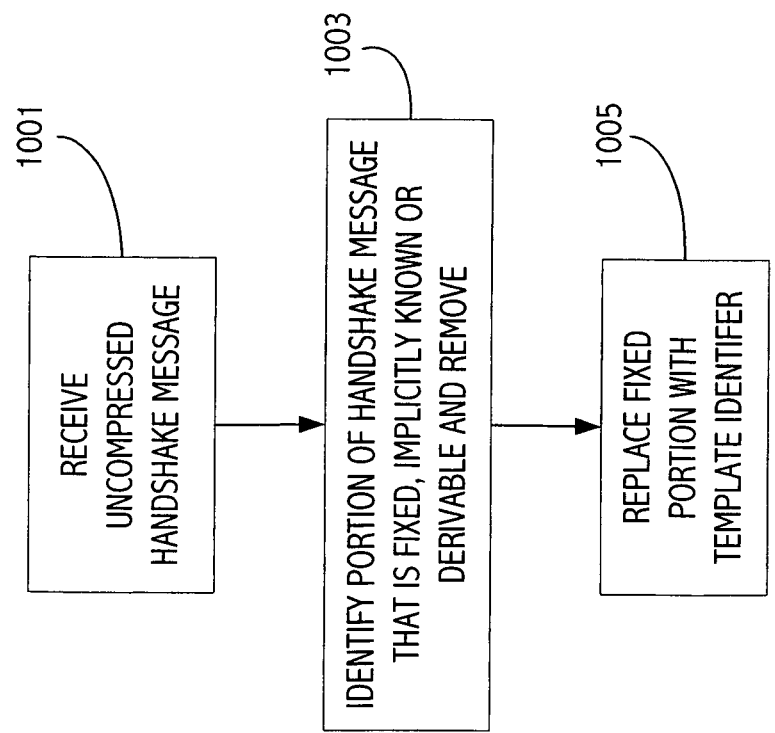
FIG. 10 illustrates a high level flow diagram of operation of an exemplary suppressor module.

Referring now to FIG. 10 a high level diagram illustrates operation of an exemplary suppressor module. The suppressor module may be implemented in software on both the gateway and the embedded device. Note that a suppressor module resides on both the gateway for generating compressed messages to the remote device and on the remote device for transmission of compressed messages to the gateway. At step 1001, the suppressor module receives an uncompressed handshake message used to establish secure communications. For the gateway suppressor module, this is a handshake message received from the monitoring control station. In 1003, the suppressor module identifies those portions of the message that can be deleted (because the information is implicitly known (like length) or easily derivable) and fixed portions of the message that can be replaced with one or more template identifiers (see, e.g., FIGS. 6 and 7). The template identifiers correspond to the fixed portion of the message removed. Those fixed portions of the message are then replaced with appropriate template identifier(s) resulting in a compressed message in 1005.

Figure 11:
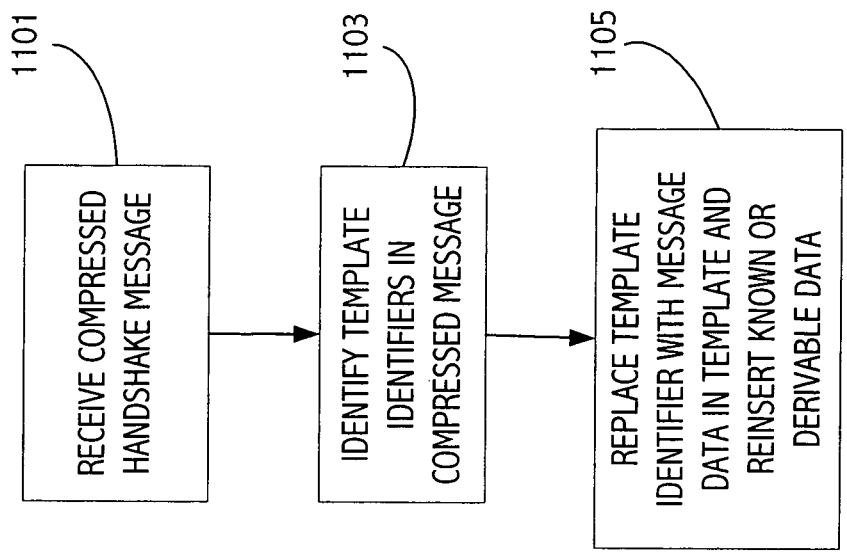
FIG. 11 illustrates a high level flow diagram of operation of an exemplary recreator module.

Referring to FIG. 11, operation of an exemplary recreator module is illustrated. The recreator module may be implemented in software on both the gateway and the embedded device. The recreator module receives the compressed handshake message in 1101, determines where the template identifiers are in the compressed message in 1103 and recreates the full message by inserting the message data from the templates in 1105 and other implicitly known or derivable information. The uncompressed message is now ready for transmission to the monitoring/control station. If the recreator module is on the embedded device, messages uncompressed by the recreator module are ready for use by the embedded device.

Previous gateway-based approaches (e.g. WAP) do not guarantee end-to-end security and make the gateway privy to all communication. In such approaches the gateway decrypts data coming on one side and re-encrypts it before passing it along. That makes the gateway a very attractive target for hackers because compromising the gateway will compromise all secure connections passing through it. In contrast, the approach described herein keeps all application data encrypted as it crosses the gateway so even if the gateway is compromised, no confidential information is revealed to the attacker.

The approach mentioned here differs from SSL compression which aims to reduce the amount of application data transmitted rather than the data sent during connection set up. SSL compression works above the SSL record layer and uses a generic data compression algorithm such as LZS or DEFLATE. Note that the technique described herein can be used in conjunction with SSL compression. The suppressor and recreator modules described here sit underneath the SSL record layer and by using specific knowledge of the structure of SSL handshake messages achieve a much higher compression ratio.

While the data compression technique described here was explained in the context of SSL, the technique can also be applied to other key establishment protocols for secure communications. For example, the data compression technique can also be applied to Internet Key Exchange (IKE), which is the key establishment protocol for IPsec (an Internet security protocol commonly used to create virtual private networks (VPNs)). The data compression technique described herein can be applied to still other Internet security protocols, e.g. Secure Shell protocol (SSH). The architecture in FIG. 1 shows a single gateway but in certain situations, multiple gateways might be deployed for fail over. The mechanism described in this document can be extended to such a scenario by having these gateways share information, e.g. the mapping of certificate identifiers to certificates.

The approaches described herein allow one to embed a secure web server in tiny devices suitable for remote monitoring and control. For example, various embodiments can be implemented the Mica2, the Mica2 dot, and the MicaZ mote devices, which are: wireless, battery-powered devices. In an exemplary embodiment the mote includes an 8-bit Atmel ATmega128L processor, 128 KB of instruction memory, 4 KB of EEPROM, 4 KB of SRAM and a Chipcon CC 1000 radio transceiver with a rated bandwidth of 19.2 kbits/s. Of course other embodiments may use different hardware platforms. In one embodiment, the mote devices run the TinyOS software stack. The approaches described herein are also equally applicable to other software stacks for mote-like devices, e.g., those developed by the Zigbee alliance.

The SSL protocol was designed to be layered atop a reliable, bi-directional, byte-stream service, typically provided by TCP. In one embodiment the operating system Tiny OS is utilized but requires a reliable data transfer mechanism for the RF link. One embodiment transmits the first and last packets in a data block with explicit ACKs. All other packets in between use a NACK-based scheme where only lost packets are explicitly signaled. In addition, three other control packets are used: (i) NEWCONNECTION indicates that the gateway has accepted a new TCP connection (ii) DISCONNECT tells the gateway to terminate a TCP connection after an HTTPS request has been fulfilled, and (iii) READY indicates a mote's readiness to receive the next SSL record from the gateway. All three are sent with explicit ACKs. SSL records are fragmented into Tiny OS packets and sent across the wireless link without the overhead of TCP or IP headers. Each Tiny OS packet has a payload of 29 bytes, but one embodiment of a reliable transmission scheme uses 6 of those bytes for housekeeping chores like sequence numbers and return addresses. Therefore, an exemplary 286-byte record containing the ServerHello, Certificate and ServerHelloDone messages is fragmented into $\lceil 286/23 \rceil = 13$ Tiny OS packets. However, when this record is transmitted on the wired link, it is sent along with a 20-byte TCP header (TCP options increase the header size) and a 20-byte IP header. Although the gateway terminates the TCP/IP connection, the security offered by SSL is end-to-end. The data transfer protocol just described is exemplary and the particular data transfer protocol utilized, including payload sizes, acknowledgements, etc., may vary in different embodiments.

The embodiments described above are presented as examples and are subject to other variations in structure and implementation within the capabilities of one reasonably skilled in the art. The details provided above should be interpreted as illustrative and not as limiting. Variations and modifications of the embodiments disclosed herein, may be made based on the description set forth herein, without departing from the scope of the invention as set forth in the following claims.

What is claimed is:

1. A method for establishing a secure connection between a first location and a remote device, comprising:
   utilizing a compressed message representation to communicate between a gateway and the remote device over a wireless link while the secure connection is being established;
   utilizing an uncompressed message representation to communicate between the gateway and the first location while the secure connection is being established;
   determining that the secure connection has been established; and
   in response to said determining:
      utilizing an uncompressed message representation to communicate between the gateway and the remote device over the wireless link after the secure connection is established.

2. The method as recited in claim 1 wherein the wireless link between the gateway and the remote device comprises a multihop wireless link in which at least one additional remote device is coupled between the gateway and the remote device.

3. The method as recited in claim 1, further comprising:
   utilizing a first network communication protocol between the first location and the gateway;
   utilizing a second network communication protocol between the gateway and the remote device.

4. The method as recited in claim 1 wherein establishing the secure connection comprises key establishment utilizing a public-key algorithm.

5. The method as recited in claim 4 wherein establishing the secure connection comprises key establishment utilizing one of Secure Sockets Layer (SSL) protocol and Internet Key Exchange.

6. The method as recited in claim 3, wherein the first network communication protocol is a transfer control protocol (TCP).

7. The method as recited in claim 4 wherein establishing the secure connection utilizes one of RSA, elliptic curve cryptography (ECC), and Diffie-Hellman for key exchange.

8. The method as recited in claim 1 wherein certificate information is exchanged between the remote device and the gateway prior to utilizing a compressed message representation for establishing the secure connection.

9. The method as recited in claim 1 wherein the gateway utilizes compressed message representation with one or more remote devices and non-compressed message representation with one or more remote devices according to whether respective remote devices support compressed message representation.

10. The method as recited in claim 1 wherein the gateway receives a communication from one or more remote devices indicating whether respective remote devices support compressed message representation.

11. The method as recited in claim 1 wherein at least two gateways are communicatively coupled to the remote device and one of the gateways is utilized when the other gateway fails.

12. The method as recited in claim 1 further comprising sending control information to the remote device over the established secure connection from the first location to control a function associated with the remote device.

13. The method as recited in claim 1 wherein establishing the secure connection includes mutual authentication using certificates.

14. The method as recited in claim 1 wherein utilizing the compressed message representation comprises reducing information transmitted between the gateway and the remote device by removing fixed parts of an uncompressed message, and inserting a message identifier to identify at least one message template corresponding to the fixed parts of the uncompressed message.

15. The method as recited in claim 1 wherein utilizing the compressed message representation comprises reducing information transmitted between the gateway and the remote device by removing information from an uncompressed message that is implicitly known or derivable by a receiver of the compressed message.

16. The method as recited in claim 14 further comprising acquiring message data to populate a message template at the gateway by observation of uncompressed messages between the remote device and the first location used to establish secure communication.

17. The method as recited in claim 14 wherein template data is sent to the gateway by the remote device to establish the message template at the gateway as part communication between the gateway and the remote device independent of the communication between the remote device and the first location.

18. The method as recited in claim 14 further comprising after receiving a message having a compressed message representation, recreating the uncompressed message for transmission to the first location.

19. The method as recited in claim 14 wherein utilizing the compressed message representation comprises replacing a certificate with a certificate identifier.

20. The method as recited in claim 19 wherein the certificate identifier is a cryptographic hash of the certificate or a portion of the cryptographic hash.

21. The method as recited in claim 1 further comprising the gateway storing one or more certificates corresponding to one or more certificate identifiers.

22. The method as recited in claim 1 wherein the gateway communicates with a plurality of remote devices.

23. The method as recited in claim 1 wherein the remote device includes a sensor and information transmitted securely includes information detected by the sensor.

24. A system for secure communication between a remote device and a first location, comprising:
a gateway comprising a processor and memory, wherein the gateway is coupled to send and receive messages over a wireless interface and a second interface, wherein the gateway is configured to:
utilize a compressed message representation for messages sent and received over the wireless interface while a secure connection is being established between the remote device and the first location;
utilize an uncompressed message representation for messages sent and received over the second interface while the secure connection is being established;
determine that the secure connection has been established; and
in response to said determining:
utilize an uncompressed message representation for messages sent and received over the wireless interface after the secure connection is established.

25. The system as recited in claim 24 further comprising the remote device communicatively coupled to the gateway via the wireless interface and capable of sending and receiving wireless messages associated with establishment of a secure communication link using the compressed message representation.

26. The system as recited in claim 24 further comprising a controller for the remote device communicatively coupled to the remote device through the gateway, the gateway communicating with the controller through the second interface.

27. The system as recited in claim 24 wherein the gateway further comprises a suppressor module responsive to receipt of a message on the second interface from the first location, the message received as part of establishment of secure communication between the first location and the remote device coupled to the wireless interface, the suppressor module operable to remove fixed information from the received message to create a compressed message representation of the received message and wherein the gateway is operable to forward the received message in compressed message representation to the remote device via the wireless interface.

28. The system as recited in claim 24 further comprising a plurality of remote devices communicatively coupled to the gateway over one or more wireless links and capable of secure communication with the first location utilizing a public-key algorithm for key establishment.

29. The system as recited in claim 28 where at least one of the remote devices communicates with the gateway over a multi-hop wireless link through at least one other of the remote devices.

30. The system as recited in claim 27 wherein the suppressor module is configured to insert a message identifier to identify at least one message template corresponding to the fixed information removed from the message to create the compressed message representation.

31. The system as recited in claim 27 wherein the gateway further comprises a data recreator module to insert message data previously removed at the remote device to recreate an uncompressed message for transmission from the gateway to the first location.

32. The system as recited in claim 27 wherein the remote device comprises a data suppressor module, responsive to create one or more compressed messages for transmission to the wireless interface during establishment of secure communications with the first location.

33. The system as recited in claim 30 wherein the gateway further includes templates storing message data corresponding to the fixed information.

34. The system as recited in claim 30 wherein length information is removed from the message in creation of the compressed message format.

35. The system as recited in claim 24 further comprising the gateway storing one or more certificates corresponding to one or more certificate identifiers.

36. A device, comprising:
a wireless interface; and
a processing element;
wherein during establishment of end to end secure communication with a monitoring device, the device is configured to:
use the processing element to utilize a compressed message representation for messages sent and received over the wireless interface while a secure connection is being established; and
wherein the device is further configured to:
determine that the secure connection has been established; and
in response to said determining:
use the processing element to utilize an uncompressed message representation for messages sent and received over the wireless interface after the secure connection is established.

37. The device as recited in claim 36 further comprising a suppressor module operable to remove fixed information from an uncompressed message, to create a compressed message representation of the uncompressed message, the uncompressed message being used in establishing the end to end secure communication.

38. The device as recited in claim 37 wherein the suppressor module is configured to insert a message identifier to identify at least one message template corresponding to the fixed information removed from the message to create the compressed message representation.

39. The device as recited in claim 37 wherein the device further comprises a data recreator module to insert message data previously removed to recreate an uncompressed message for use by the device.

40. The device as recited in claim 37 wherein the device is an embedded device with limited computational resources.

41. The device as recited in claim 37 wherein the device is a low power device.

* * * * *